United States Patent
Lindoff et al.

(10) Patent No.: US 9,654,443 B2
(45) Date of Patent: May 16, 2017

(54) LOCAL DEVICE IDENTITY ALLOCATION FOR NETWORK ASSISTED DEVICE-TO-DEVICE D2D COMMUNICATION

(71) Applicant: Telefonaktiebolaget L M Ericsson (publ), Stockholm (SE)

(72) Inventors: Bengt Lindoff, Bjärred (SE); Gabor Fodor, Hässelby (SE); Leif Wilhelmsson, Dalby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/400,577

(22) PCT Filed: May 8, 2013

(86) PCT No.: PCT/EP2013/059595
§ 371 (c)(1),
(2) Date: Nov. 12, 2014

(87) PCT Pub. No.: WO2013/171113
PCT Pub. Date: Nov. 21, 2013

(65) Prior Publication Data
US 2015/0156165 A1 Jun. 4, 2015

Related U.S. Application Data

(60) Provisional application No. 61/646,987, filed on May 15, 2012.

(30) Foreign Application Priority Data

May 15, 2012 (EP) ..................... 12167973

(51) Int. Cl.
*H04L 29/12* (2006.01)
*H04W 8/00* (2009.01)
(Continued)

(52) U.S. Cl.
CPC .......... *H04L 61/2038* (2013.01); *H04L 67/12* (2013.01); *H04W 8/005* (2013.01);
(Continued)

(58) Field of Classification Search
CPC ..................................... H04W 84/18
See application file for complete search history.

(56) References Cited

U.S. PATENT DOCUMENTS 6,574,266 B1    6/2003  Haartsen
2004/0214571 A1* 10/2004  Hong .................... H04W 8/005
                                                    455/435.1

(Continued)

FOREIGN PATENT DOCUMENTS

EP    1471693 A2    10/2004
EP    2421326 A1     2/2012
(Continued)

OTHER PUBLICATIONS

Doppler, K. et al., "Device-to-Device communications; functional prospects for LTE-Advanced networks", IEEE International Conference on Communications Workshops, Dresden, Germany, Jun. 14-18, 2009, 1-6.

(Continued)

*Primary Examiner* — Huy D Vu
*Assistant Examiner* — Teisha D Hall
(74) *Attorney, Agent, or Firm* — Murphy, Bilak & Homiller, PLLC

(57) ABSTRACT

A method of a network node adapted to provide assistance of device-to-device communication is disclosed. The method comprises receiving, from a first wireless communication device adapted to perform device-to-device communication, one or more first global device identities associated with the first wireless communication device and allocating one or more first local device identities to the first (Continued)

wireless communication device based on the received global device identities (330). The method also comprises storing, in association to the network node, a mapping between each received one or more first global device identity and each allocated one or more first local device identity, transmitting information indicative of the allocated one or more first local device identities to the first wireless communication device, and transmitting information indicative of at least one of the allocated one or more first local device identities to a first group of one or more other wireless communication devices (350). A method of a wireless communication device adapted to perform device-to-device communication is also disclosed. The method comprises receiving, from a network node, information indicative of at least one local device identity allocated to another wireless communication device, and monitoring device-to-device communication beacon signaling based on the received at least one local device identity.

9 Claims, 4 Drawing Sheets

(51) Int. Cl.
*H04W 76/02* (2009.01)
*H04L 29/08* (2006.01)
*H04W 84/18* (2009.01)

(52) U.S. Cl.
CPC .......... *H04W 76/023* (2013.01); *H04L 61/10* (2013.01); *H04L 61/6072* (2013.01); *H04W 76/02* (2013.01); *H04W 84/18* (2013.01)

(56) References Cited

U.S. PATENT DOCUMENTS

| | | |
|---|---|---|
| 2006/0083187 A1 | 4/2006 | Dekel |
| 2008/0102816 A1 | 5/2008 | Shan et al. |
| 2010/0128701 A1 | 5/2010 | Nagaraja |
| 2011/0070897 A1 | 3/2011 | Tang et al. |
| 2011/0098043 A1* | 4/2011 | Yu ..................... H04W 60/00 455/435.1 |
| 2011/0258313 A1 | 10/2011 | Mallik et al. |
| 2011/0300892 A1 | 12/2011 | Hakola et al. |
| 2013/0102314 A1 | 4/2013 | Koskela et al. |
| 2013/0322388 A1 | 12/2013 | Ahn et al. |
| 2014/0057670 A1 | 2/2014 | Lim et al. |
| 2014/0169279 A1 | 6/2014 | Song et al. |
| 2014/0247802 A1 | 9/2014 | Wijting et al. |

FOREIGN PATENT DOCUMENTS

| | | |
|---|---|---|
| WO | 2010006649 A1 | 1/2010 |
| WO | 2011085073 A1 | 7/2011 |
| WO | 2011109027 A1 | 9/2011 |
| WO | 2011112683 A1 | 9/2011 |
| WO | 2011116815 A1 | 9/2011 |
| WO | 2011121374 A1 | 10/2011 |
| WO | 2011134397 A1 | 11/2011 |
| WO | 2011149318 A2 | 12/2011 |
| WO | 2012091418 A2 | 7/2012 |
| WO | 2013068788 A1 | 5/2013 |

OTHER PUBLICATIONS

Doppler, Klaus et al., "Device-to-Device Communication as an Underlay to LTE-Advanced Networks", IEEE Communications Magazine, Vo. 47, Issue 12, Dec. 2009, 42-49.

Fodor, Gábor et al., "Design Aspects of Network Assisted Device-to-Device Communications", IEEE Communications Magazine, Mar. 2012, 170-177.

Unknown, Author, "Operator Managed and Operator Assisted D2D", 3GPP TSG-SA WG1 Meeting #57, S1-120063, Intel, Kyoto, Japan, Feb. 13-17, 2012, 1-4.

* cited by examiner

LOCAL DEVICE IDENTITY ALLOCATION FOR NETWORK ASSISTED DEVICE-TO-DEVICE D2D COMMUNICATION

TECHNICAL FIELD

The present invention relates generally to the field of network assisted device to device communication. More particularly, it relates to beacon management of such communication.

BACKGROUND

Device-to-Device (D2D) communication refers to direct communication between devices. In D2D communication data to be transmitted from a first device to a second device is typically not relayed via any cellular network. Some examples of D2D communication of the prior art are Bluetooth communication, FlashlinQ communication, WLAN (e.g. IEEE 802.11) communication (e.g. WIFI direct).

Device-to-device communication may be applicable in various scenarios. One scenario is when a cellular radio access network is present, and able to set up a cellular connection between two devices. D2D communication may be a complement to the cellular communication in such scenarios.

There may be situations when D2D communication may provide better performance (better signal quality, higher bit rate, lower latency, etc) than cellular communication. This may be due to proximity between the devices and/or specific signaling gain of the D2D protocol (e.g. hop gain).

In some situations, the network may have constraints (e.g. due to being heavily loaded) resulting in that a service cannot be provided at all using a network connection. Then, D2D communication would be an alternative.

There may also be situations when D2D communication may be preferred by the user of a device (e.g. due to billing costs).

D2D communication may improve spectrum efficiency and reduce the network load for the cellular network, since the D2D connection typically uses another spectrum range (e.g. an unlicensed spectrum) than the cellular network (typically licensed spectrum). Furthermore, since cellular communication uses an uplink-downlink pair for each of the two devices while a D2D connection would only use one link pair, spectrum efficiency is improved even if the D2D connection would use cellular spectrum resources. This would be true even for network assisted D2D communication where most of the data would be transmitted over the D2D connection and only a small amount of information is to be transmitted over the network link.

In D2D communication scenarios, it is envisioned that there may be a large amount of D2D capable devices in vicinity to one another, e.g. in the area covered by a particular network node or in a smaller region. This allows for many possibilities for D2D link establishment, but the situation may also cause quite some interference generated by the D2D signaling, e.g. peer discovery. Optimizing e.g. link performance and system performance in such scenarios is a complex task.

D2D communication may be ad hoc or may be network assisted. For example, a cellular network may assist a D2D connection by establishing security of the D2D link and/or partly or fully controlling the setup of the D2D connection (e.g. device/peer discovery and resource allocation). A cellular network may also assist D2D communication by controlling the interference environment. For example, if using licensed operator's spectrum for the D2D communication, higher reliability can be provided than when operating in unlicensed spectrum. To assist the D2D connection, the network may also provide synchronization and/or partial or full Radio Resource Management (RRM).

Device/peer discovery in D2D communication is typically based on the devices transmitting (e.g. broadcasting) and/or detecting beacon signals respectively. In network assisted D2D device discovery, the network may assist the devices by allocating beacon resources and providing information that the devices can use to construct and detect the beacon signals used for the discovery.

The article "Design aspects of network assisted device-to-device communications" by Fodor, Dahlman, Mildh, Parkvall, Reider, Miklos and Turányi, pages 170-177 in IEEE Communications Magazine, March 2012 discloses that the network can mediate in the discovery process by recognizing D2D candidates and coordinating the time and frequency allocations for sending/scanning for beacons.

U.S. Pat. No. 6,574,266 B1 discloses a base station transmitting a beacon signal including information about the identity and system clock of the base station. The base terminal exchanges information between remote terminals that enables the master terminal to establish a direct communication session with a slave terminal. In order to enable a fast setup of the connection between the terminals, the identity and clock of the master terminal is relayed by the master base station to the other terminal or terminals.

Typically, a beacon signal for a device could be based on the identity of the device, or could be randomly drawn from a set of beacon signals. This applies both if the network allocates the beacons and if the beacons are not provided by the network.

The beacon signals are then transmitted by the respective (master) devices (typically at certain time intervals). The listening (slave) devices then need to scan for beacons. It should be noted that a device may take the role of master only, slave only or a combination of both roles. When a beacon is detected, the corresponding slave typically sends an acknowledgement to the corresponding master, and a D2D connection can be initiated.

Having the beacon signaling allocated and coordinated by a network (as in the IEEE Communications Magazine article cited above) reduces the beacon collision risk. Furthermore, letting the slaves have beacon information of the master(s) (as in both of the disclosures cited above) might improve scanning performance (e.g. shorter time to discovery, lower power consumption).

However, the acknowledgements transmitted in an uncoordinated manner (before the D2D connection is set up) suffers a collision risk and/or may increase the interference level in the system.

Furthermore, allocation of beacons in the network and efficient transmission of the allocation information to the devices becomes cumbersome when the possible number of devices to be considered for device-to-device communication increases.

Therefore, there is a need for alternative approaches to network assisted device-to-device connection setup. There is a need for alternative approaches to beacon resource allocation by a network, as well as transmission of information relating to the allocated beacon resources to devices. There is also a need for alternative approaches to beacon acknowledgement transmission.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide alternative approaches to network assisted device-to-device connection setup.

According to a first aspect, some embodiments comprise a method of a first wireless communication device adapted to perform device-to-device communication. The method comprises transmitting an indication of device-to-device communication capability to a network node adapted to provide assistance of device-to-device communication and receiving, from the network node, one or more beacon parameters allocated to one or more second wireless communication devices adapted to perform device-to-device communication. The method also comprises monitoring device-to-device communication beacon signaling based on the received one or more beacon parameters of the one or more second wireless communication devices, and performing at least one radio operation task based on measurements of the monitored device-to-device communication beacon signaling.

In some scenarios, the terms radio operation task (ROT), network operation task and radio resource management may be interchangeably used. In other scenarios, the term radio operation task may embrace a network operation task and also other tasks, and/or the term network operation task may embrace radio resource management and also other tasks.

Monitoring device-to-device communication beacon signalling may refer to performing one or more measurements on the beacon signaling. Such measurements may include, for example, one or more of identification and/or detection of a beacon sent by a second wireless communication device, and signal measurement on an identified beacon signal. Examples of signal measurements are signal strength (e.g. RSRP, path loss, path gain etc), and signal quality (e.g. SINR, SNR, RSRQ, BLER, BER etc).

Performing the at least one radio operation task may, in some embodiments, comprise using the measurements of the monitored device-to-device communication beacon signaling to perform at least one of selecting one of the one or more second wireless communication devices for device-to-device communication, and re-selecting one of the one or more second wireless communication devices for device-to-device communication.

In some embodiments, performing the at least one radio operation task may comprise transmitting a beacon measurement report to the network node based on the monitored device-to-device communication beacon signaling.

Thus, some examples of radio operation tasks comprise transmitting a beacon measurement report to the network node based on the monitored device-to-device communication beacon signaling, and using a beacon measurement for selecting or re-selecting a second wireless communication device for establishing/re-establishing or initiating device-to-device communication.

The selection of a second wireless communication device for D2D communication may be based on a pre-defined rule and/or a combination of a pre-defined rule and network signaled parameters. For example, the first wireless communication device may autonomously select the second wireless communication device, or may use other information signaled by the network node for the selection. An example of a network signaled parameter is a signal strength threshold above which the second wireless communication device may be selected for device-to-device communication. Similar examples apply to the re-selection of a second wireless communication device.

The indication may comprise information regarding which D2D capabilities the first device has (e.g. Bluetooth, WLAN, using cellular resources, measurement capabilities, etc). The indication may comprise a global device identity. A registration procedure may comprise a master/slave setup of the first device.

The one or more beacon parameters of the one or more second wireless communication device may comprise at least one of a local device identity and a beacon reception pattern.

The allocation of beacon parameters to the second devices may be performed by the network node or by another (e.g. neighboring) network node.

The choice of which devices should belong to the one or more second devices may be made based on how probable it is that these devices will be able to have a D2D connection with the first device and/or cause interference to the first device. One example is to base the choice on geographical vicinity to the first device.

The beacon measurement report may comprise information regarding the detected device(s) e.g. local device identity, timing and/or frequency of detected beacon, signal strength of detected beacon, and/or estimated path loss (if the first device is aware of the transmission power, if not the network node may estimate the path loss possibly after having received information of the beacon transmission power from the relevant beacon transmitting device).

The beacon measurement report may be empty.

The beacon measurement report may be transmitted after a beacon is detected, periodically, and/or after a timer has run out.

The transmission of the indication of device-to-device communication capability may be comprised in a registration procedure of the first wireless communication device to the network node.

The method may further comprise detecting a beacon signal associated with at least one of the one or more second wireless communication devices. The detection may be based on signal strength of the received beacon and/or signal quality. The detection may comprise mapping the received signal to a local device identity.

In some embodiments, the method may further comprise receiving one or more beacon parameters of the first wireless communication device and transmitting a beacon signal based on the received one or more beacon parameters associated with the first wireless communication device. The one or more beacon parameters associated with the first wireless communication device may comprise at least one of: a local device identity, a beacon signature, a beacon transmission power, and a beacon transmission pattern.

The method may further comprise transmitting a beacon configuration request to the network node and receiving the one or more beacon parameters is in response thereto.

In some embodiments, the method may further comprise receiving, from the network node, one or more beacon parameters allocated by a neighboring network node to one or more third wireless communication devices adapted to perform device-to-device communication, and monitoring device-to-device communication beacon signaling based on the received one or more beacon parameters of the one or more third wireless communication devices. The beacon measurement report to the network node may then comprise a cell identity indication.

In a second aspect, some embodiments comprise a method of a network node adapted to provide assistance of device-to-device communication. The method comprises allocating beacon resources to one or more second wireless communication devices adapted to perform device-to-device communication, and receiving, from a first wireless communication device adapted to perform device-to-device communication, an indication of device-to-device communication capability. The method also comprises transmitting, to the first wireless communication device, one or more beacon parameters related to the allocated beacon resources of the one or more second wireless communication device, and receiving, from the first wireless communication device, a beacon measurement report related to at least one of the one or more second wireless communication devices.

The method may further comprise assisting connection setup between the first wireless communication device and one of the one or more second wireless communication device based on the beacon measurement report.

In some embodiments, the method further comprises detecting that a location change has occurred for one of the second wireless communication devices. The allocation of beacon resources may then comprise allocating beacon transmission resources to only the second wireless device for which the location change has occurred.

Allocating beacon resources to one or more second wireless communication devices may comprise receiving, from one or more neighboring network nodes, one or more beacon parameters allocated by the respective neighboring network node to at least one of the one or more second wireless communication devices. The received beacon measurement report may then comprise a cell identity indication. The method may further comprise performing a cell change for the first wireless communication device based on the beacon measurement report, and/or requesting, from a neighboring network node, a cell change to the network node for one of the second wireless communication devices based on the beacon measurement report.

In some embodiments, the method further comprises transmitting the received beacon measurement report to at least one of the one or more second wireless communication devices.

In a third aspect, some embodiments comprise a method of a first wireless communication device adapted to perform device-to-device communication. The method comprises receiving, from a network node, one or more beacon parameters allocated to the first wireless communication device, transmitting device-to-device communication beacon signaling based on the received one or more beacon parameters of the first wireless communication devices, and receiving a beacon measurement report from the network node indicating detection of the transmitted beacon by one or more second wireless communication devices.

In a fourth aspect, some embodiments comprise an arrangement of a first wireless communication device adapted to perform device-to-device communication. The arrangement comprises a transmitter adapted to transmit an indication of device-to-device communication capability to a network node adapted to provide assistance of device-to-device communication. The arrangement also comprises a receiver adapted to receive, from the network node, one or more beacon parameters allocated to one or more second wireless communication devices adapted to perform device-to-device communication, and a controller adapted to cause the receiver to monitor device-to-device communication beacon signaling based on the received one or more beacon parameters of the one or more second wireless communication devices. The controller is also adapted to cause at least one of the transmitter and receiver to perform at least one radio operation task based on measurements of the monitored device-to-device communication beacon signaling.

In some embodiments, the at least one radio operation task may comprise using the measurements of the monitored device-to-device communication beacon signaling to perform at least one of selecting one of the one or more second wireless communication devices for device-to-device communication, and re-selecting one of the one or more second wireless communication devices for device-to-device communication.

In some embodiments, the at least one radio operation task may comprise transmitting a beacon measurement report to the network node based on the monitored device-to-device communication beacon signaling, and to transmit a beacon measurement report to the network node based on a monitored device-to-device communication beacon signalling.

The arrangement may further comprise a detector adapted to detect a beacon signal associated with at least one of the one or more second wireless communication devices.

In a fifth aspect, some embodiments comprise an arrangement of a first wireless communication device adapted to perform device-to-device communication. The arrangement comprises a receiver adapted to receive, from a network node, one or more beacon parameters allocated to the first wireless communication device, and a adapted to transmit device-to-device communication beacon signaling based on the received one or more beacon parameters of the first wireless communication devices. The receiver is further adapted to receive a beacon measurement report from the network node indicating detection of the transmitted beacon by one or more second wireless communication devices.

In a sixth aspect, some embodiments comprise an arrangement of a network node adapted to provide assistance of device-to-device communication. The arrangement comprises a processor adapted to allocate beacon resources to one or more second wireless communication devices adapted to perform device-to-device communication, a receiver adapted to receive, from a first wireless communication device adapted to perform device-to-device communication, an indication of device-to-device communication capability, and a transmitter adapted to transmit, to the first wireless communication device, one or more beacon parameters related to the allocated beacon resources of the one or more second wireless communication device. The receiver is further adapted to receive, from the first wireless communication device, a beacon measurement report related to at least one of the one or more second wireless communication devices.

In a seventh aspect, some embodiments comprise a method of a network node adapted to provide assistance of device-to-device communication. The method comprises receiving, from a first wireless communication device adapted to perform device-to-device communication, one or more first global device identities associated with the first wireless communication device, and allocating one or more first local device identities to the first wireless communication device, based on the received one or more first global device identities associated with the first wireless communication device. The method also comprises storing, in association to the network node, a mapping between each received one or more first global device identity and each allocated one or more first local device identity, transmitting information indicative of the allocated one or more first local device identities to the first wireless communication device, and transmitting information indicative of at least one of the allocated one or more first local device identities to a first group of one or more other wireless communication devices adapted to perform device-to-device communication.

Global device identities may be received from a plurality of devices.

The set of possible local device identities is typically much smaller than the set of possible global device identities, and the representation of the local device identities may, typically be shorter than that of the global device identities. A network node may have the same, different, or overlapping set of local device identities as another network node.

Storing in association with a network node may comprise storing in the network node, in a memory connected to the network node, or in another network node, for example.

The transmission of information indicative of the allocated one or more first local device identities may comprise transmission of a full or partial mapping.

Allocating the one or more first local device identities based on the received one or more first global device identities may comprise, for each particular received one or more first global device identity: allocating a unique first local device identity to the particular first global device identity, allocating a plurality of first local device identities to the particular first global device identity, or allocating a first local device identity to the particular first global device identity, wherein the first local device identity is allocated to a plurality of first global device identities.

Receiving the one or more first global device identities associated with the first wireless communication device may be comprised in a registration procedure of the first wireless communication device to the network node.

In some embodiments, transmitting the first local device identities to the one or more other wireless communication devices may be performed on request of one of the one or more other wireless communication devices, and/or as a broadcast operation.

The first group of one or more other wireless communication devices may comprise a set of wireless communication devices adapted to perform device-to-device communication and registered to the network node. The set may, for example, comprise all device-to-device capable devices operating under a network node or a subset thereof. For example, the set may comprise wireless communication devices fulfilling one or more device-to-device communication criteria in relation to the first wireless communication device. The criterion may comprise geographical vicinity, radio conditions on the device-to-device link, and/or radio conditions on any of the device-to-network links. Information relating thereto may be tagged to the mapping.

The method may further comprise allocating one or more first operator identities to the first wireless communication device.

In some embodiments, the method may further comprise reallocating one or more other first local device identities to the first wireless communication device, based on the received one or more first global device identities associated with the first wireless communication device, discarding the mapping between each received one or more first global device identity and each allocated one or more first local device identity, and storing, in association to the network node, a mapping between each received one or more first global device identity and each reallocated one or more other first local device identity. The method then further comprises transmitting information indicative of the reallocated one or more other first local device identities to the first wireless communication device, and transmitting information indicative of at least one of the reallocated one or more other first local device identities to the first group of one or more other wireless communication devices.

Reallocation may be applied, for example, when one or more devices leave or enter the cell, or to maximize the signal distance between particular devices.

The method may, in some embodiments, further comprise receiving, from a second wireless communication device adapted to perform device-to-device communication, one or more second global device identities associated with the second wireless communication device, and allocating one or more second local device identities to the second wireless communication device, based on the received one or more second global device identities associated with the second wireless communication device. A mapping between each received one or more second global device identity and each allocated one or more second local device identity may be stored in association to the network node. The method may also comprise transmitting information indicative of the allocated one or more second local device identities to the second wireless communication device, and transmitting information indicative of at least one of the allocated one or more second local device identities to a second group of one or more other wireless communication devices adapted to perform device-to-device communication.

The first device may be part of the second group and/or the second device may be part of the first group. The first and second groups may be identical, partially overlapping or different.

In an eighth aspect, some embodiments comprise a method of a first wireless communication device adapted to perform device-to-device communication. The method comprises receiving, from a network node, information indicative of at least one second local device identity allocated to a second wireless communication device adapted to perform device-to-device communication, and monitoring device-to-device communication beacon signaling based on the received at least one second local device identity.

The method may further comprise transmitting, to the network node, one or more first global device identities associated with the first wireless communication device, and receiving, from the network node, information indicative of one or more first local device identities allocated to the first wireless communication device.

In a ninth aspect, some embodiments comprise an arrangement of a network node adapted to provide assistance of device-to-device communication. The arrangement comprises a receiver adapted to receive, from a first wireless communication device adapted to perform device-to-device communication, one or more first global device identities associated with the first wireless communication device, a processor adapted to allocate one or more first local device identities to the first wireless communication device, based on the received one or more first global device identities associated with the first wireless communication device, and a transmitter adapted to transmit information indicative of the allocated one or more first local device identities to the first wireless communication device and to transmit information indicative of at least one of the allocated one or more first local device identities to a first group of one or more other wireless communication devices adapted to perform device-to-device communication.

The arrangement may further comprise a memory adapted to store a mapping between each received one or more first global device identity and each allocated one or more first local device identity.

In a tenth aspect, some embodiments comprise an arrangement of a first wireless communication device adapted to perform device-to-device communication. The arrangement comprises a receiver adapted to receive, from a network node, information indicative of at least one second local device identity allocated to a second wireless communication device adapted to perform device-to-device communication, and a controller adapted to cause the receiver to monitor device-to-device communication beacon signaling based on the received at least one second local device identity.

The arrangement may further comprise a transmitter adapted to transmit, to the network node, one or more first global device identities associated with the first wireless communication device, and the receiver may be further adapted to receive, from the network node, information indicative of one or more first local device identities allocated to the first wireless communication device.

In an eleventh aspect, some embodiments comprise a wireless communication device adapted to perform device-to-device communication and comprising the arrangement of any of the fourth, fifth and/or tenth aspect.

In a twelfth aspect, some embodiments comprise a network node adapted to provide assistance of device-to-device communication and comprising the arrangement of any of the sixth and/or ninth aspect.

In a thirteenth aspect, some embodiments comprise a computer program product comprising a computer readable medium, having thereon a computer program comprising program instructions, the computer program being loadable into a data-processing unit and adapted to cause execution of the method according to any of the first, second, third, seventh and/or eighth aspect when the computer program is run by the data-processing unit.

In some embodiments, the fourth, fifth, sixth, ninth and tenth aspects of the invention may additionally have features identical with or corresponding to any of the various features as explained above for the first, second, third, seventh and eighth aspects respectively.

An advantage of some embodiments is that the information regarding allocated beacon resources may be efficiently provided to the respective devices (beacon transmitting devices and/or beacon scanning devices). This is enabled by the use of a short local device identity instead of a much longer global device identity or other means of communicating specific resource to use (e.g. time, frequency, signal shape, beacon signature, signal pattern, etc).

Another advantage of some embodiments is that a dynamic beacon allocation is enabled by the various mapping possibilities between local and global device identities (e.g. one-to-one, one-to-many, many-to-one).

Another advantage of some embodiments is that, since the local device identity of one device is made available to other devices, the other devices' scanning process is simplified.

Yet another advantage of some embodiments is that the collision risk of the acknowledgement messages is deceased via introduction of the beacon measurement reports from a slave device to the network. This may also reduce interference, since the reports are not transmitted in unlicensed spectrum and will probably need less (if any) retransmissions.

A further advantage of some embodiments is that, based on the beacon measurement reports, the network may further assist in the setup of a connection between two devices. For example, the network may have better basis for deciding whether to use a D2D connection or a cellular connection based on the contents of the reports.

Yet a further advantage of some embodiments is that the radio conditions applicable for D2D communication may be estimated in an efficient way.

BRIEF DESCRIPTION OF THE DRAWINGS

Further objects, features and advantages will appear from the following detailed description of embodiments, with reference being made to the accompanying drawings, in which.

DETAILED DESCRIPTION

Figure 1A:
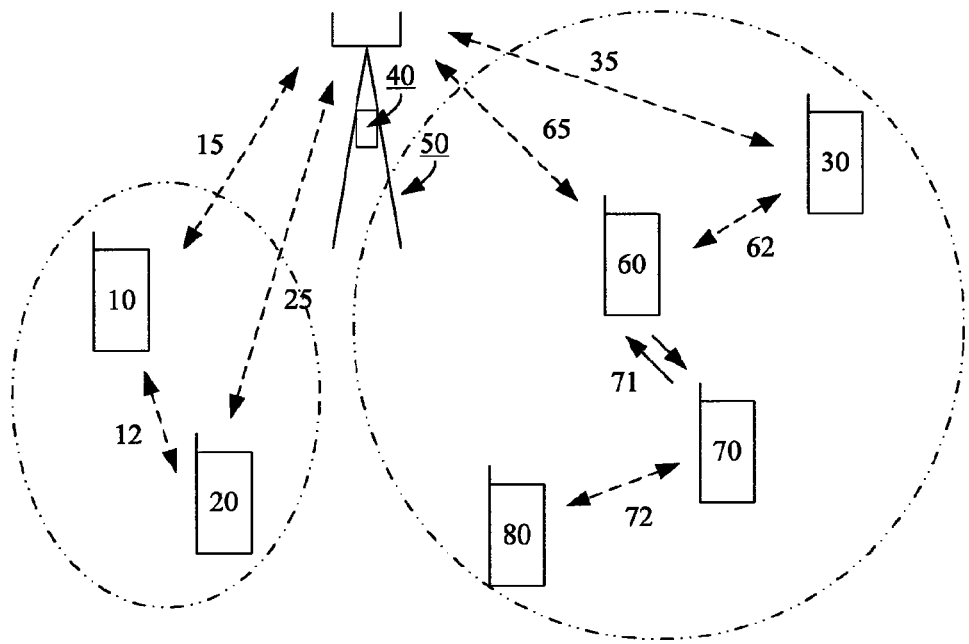
FIGS. 1a and 1b are schematic drawings illustrating devices in a network according to some embodiments.

It is noted that D2D protocols/communication/connection when used herein relates to any known or future suitable D2D application. Examples include, but are not limited to, Bluetooth, WLAN (WIFI direct), FlashlinQ, and D2D using cellular spectrum. For example, a network assisted D2D communication may use uplink and/or downlink resources of the cellular spectrum as allocated by the network node. The D2D communication may be TDD or FDD. The network node may impose restrictions on the D2D communication (particularly when cellular and/or licensed spectrum is used), e.g. power control such as a maximum allowed transmission power and/or power control commands.

Similarly, it is noted that cellular protocols/communication/connection when used herein relates to any known or future suitable cellular application. Examples include, but are not limited to, 3GPP cellular standards (e.g. GSM, WCDMA, TD-SCDMA, LTE), WLAN, and even device-to-device networks. A network node may, for example, comprise a base station, a NodeB, an eNodeB, or a WLAN access point.

A network node may be any suitable part of a network (e.g. a serving or controlling node), e.g. a cellular base station, a relay node, a wireless access point, or a core network node.

A beacon or beacon signal may be a signal broadcast from a device (network node or wireless communication device) making it possible for other devices to note the presence of the device. It may have fixed or variable transmission power. It may typically be used for peer discovery in D2D communication scenarios, but may also be applicable in other scenarios. In some applications, a beacon may be referred to as a type of reference signal or synchronization signal.

The beacon transmission may take place in an un-licensed spectrum or in a licensed spectrum. Similarly the D2D communication may take place in an un-licensed spectrum or in a licensed spectrum, not necessarily depending on which spectrum was used for the beacon transmission.

In the following, embodiments will be described where alternative approaches to network assisted device-to-device connection setup are taken.

For example, network assisted D2D link estimation may be provided according to some approaches. This may be beneficial for centralized interference coordination, for example. Centralized (i.e. network assisted) interference coordination of D2D communication typically requires that the network node (and possibly also the devices) is at least partly aware of the applicable interference situation (or more generally the applicable radio conditions). Acquiring this awareness is a complex task that may be facilitated by some embodiments presented herein.

Some embodiments use a short and therefore efficient local device identity (LDID) as a bearer of beacon information. This local device identity is allocated in a network node to a corresponding global device identity (GDID) conveyed by a device to the network node.

Each GDID may be associated with a device per se or with one (possibly out of several) subscription used by the device. Even further, a device (or subscription) may be associated with different GDIDs for different services (offered or requested by the device), for example. One example is to use IMSI as a GDID. An example of several GDIDs for a single device could be a vending machine selling several beverages, each having its own GDID. A GDID could be a combination of, for example, a subscription specific and service specific ID. The GDIDs are typically associated with the devices independently of the location or current tracking area or cell association of that device.

The set of possible LDIDs kept at a network node may be designed to minimize a mutual cross correlation or maximize a signal distance between the corresponding beacons. The subset of LDIDs used at a particular moment may also be chosen with such conditions in mind. The size of a subset of LDIDs used at a particular moment may, for example, depend on a current number of D2D capable devices in a cell or on a current number of D2D active devices in the cell. Thus, the number and/or the characteristics of the local device identities used by the network node for D2D communication in a cell may be determined by using one or more criteria. Example criteria include, but are not limited to, a current number of D2D capable devices operating in the cell, a correlation characteristic of the LDIDs, a total number of available LDIDs, LDIDs used by neighboring network nodes, etc.

Information indicative of the allocated local device identity is transmitted to the corresponding device and may be used to determine how to transmit a beacon signal. Information indicative of the allocated local device identity is also transmitted to other devices and may be used to determine how to receive or detect a beacon signal.

The mapping between global and local device identities may be updated as required. For example, an update may be needed when a device enters or leaves a cell. An update may, for example, be beneficial to maximize the signal distance between the used beacons.

In some embodiments, a network node allocates beacon resources to each D2D capable (master) device. Information regarding the allocation is transmitted to the corresponding device and other D2D capable (slave) devices. The corresponding device uses the information to transmit its beacon signal. The other devices use the information to monitor relevant beacon resources to possibly detect a beacon signal.

The other devices transmit respective beacon measurement reports to the network. The reports may be transmitted at predetermined times/intervals (regardless of whether a beacon has been detected or not) and/or as a consequence of beacon detection.

The reports may be useful for the network node to assist in setting up a connection between two corresponding devices. For example, the reports may be used to determine whether to use a D2D connection or a cellular connection. If a D2D connection is to be used, information of the report may be used in the setup procedure.

FIG. 1a is a schematic drawing illustrating devices 10, 20, 30, 60, 70, 80 in a network comprising a base station site 50 with a base station (network node) 40. The network node 40 is connected to each of the devices 10, 20, 30, 60, 70, 80 via respective wireless links 15, 25, 35, 65 (all links not shown in the figure). The devices have D2D capability. In addition, there may be devices (not shown) which are not D2D capable. Since the devices 10 and 20 are geographically close to each other the radio conditions for direct communication between them are very good in this example. Hence, the network node has assisted (via links 15 and 25) them to set up a D2D wireless link 12. Similarly, devices 30 and 60 are connected via D2D link 62 and devices 70 and 80 are connected via D2D link 72. Also shown is a potential interference situation, illustrated by 71, between devices 60 and 70. Devices 10 and 20 may be seen as one group where the devices are relevant to each other (in this case for a prospect D2D connection via link 12), and devices 30, 60, 70 and 80 may be seen as one other group where the devices are relevant to each other (in this case for prospect D2D connections via links 62 and/or 72, but also in terms of the interference 71).

Figure 1B:
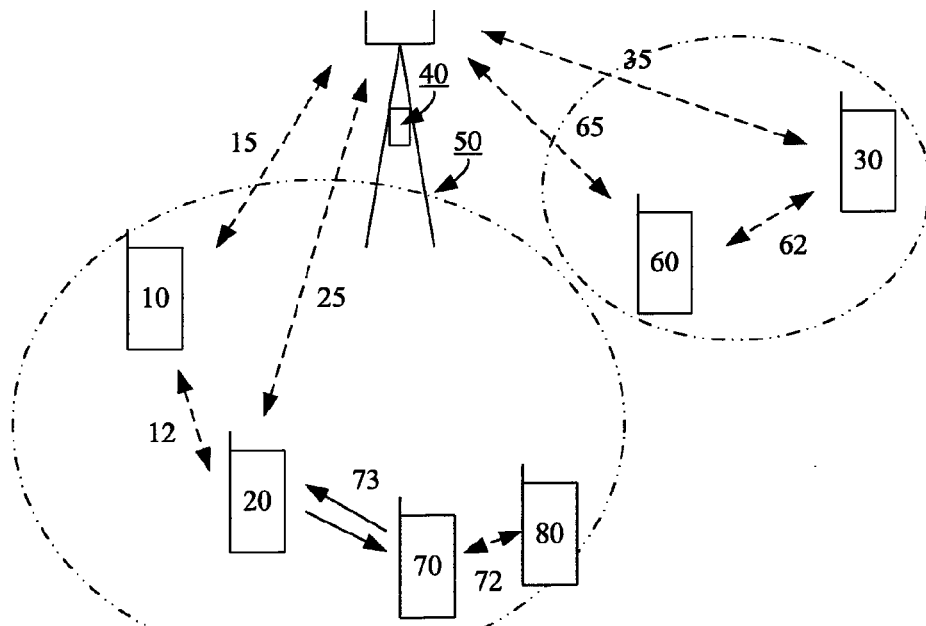

FIG. 1b is a schematic drawing illustrating devices 10, 20, 30, 60, 70, 80 in a network comprising a base station site 50 with a base station (network node) 40. FIG. 1b illustrates a situation at a later moment in time compared to FIG. 1a. In FIG. 1b, the device 70 has moved and is now in another location. The devices 70 and 80 are still connected via D2D link 72. However, device 70 is now far from device 60 and the interference situation experienced in FIG. 1a has changed. Instead, there is now a potential interference situation, illustrated by 73, between devices 20 and 70. Thus, devices 10, 20, 70 and 80 may now be seen as one group where the devices are relevant to each other, and devices 30 and 60 may be seen as one other group where the devices are relevant to each other.

Before the network node can allocate resources for D2D communication, it is beneficial for the network node to know which devices can hear each other (e.g. peer discovery) and the condition of their mutual links (e.g. radio condition, interference, etc). Such information should, preferably, be achieved in a structured and efficient manner. It may also be beneficial if each (or some) of the devices had access to at least part of this knowledge.

Figure 2:
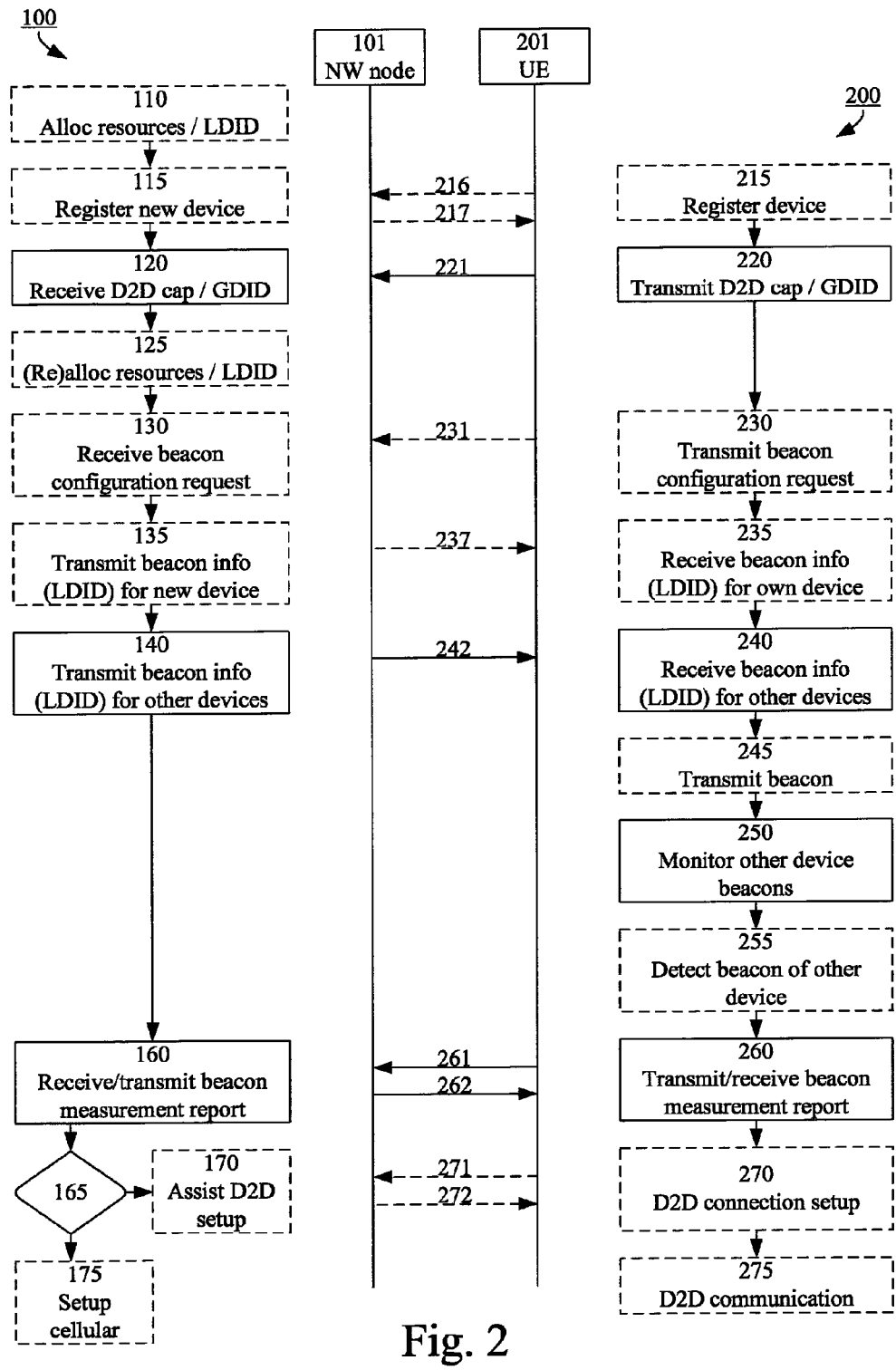
FIG. 2 is a combined flowchart and signaling diagram illustrating example methods and signaling according to some embodiments.

FIG. 2 is a combined flowchart and signaling diagram illustrating example methods performed by a network node (e.g. the network node 40 of FIG. 1a) and a D2D capable device (e.g. one of the devices 10 and 20 of FIG. 1a) respectively and signaling between them according to some embodiments.

A method 100 is performed by a network node 101 and a method 200 is performed by a device (user equipment—UE) 201.

If there are already other D2D capable devices registered to the network node, the network node has allocated beacon resources to them in 110. The allocation of beacon resources may comprise allocation of a local device identity (LDID) as will be described later in connection to FIG. 3. The local device identity may be representative (e.g. via a look-up table or via a shift register initiated with the LDID) of beacon resources (e.g. a time and/or frequency, a signal shape, a beacon signature, a transmission pattern, a transmission power, etc.). In some embodiments, a Primary/Secondary Synchronization Signal (PSS/SSS) may be used as a beacon signal. Other examples include Zadoff-Chu sequences and M-sequences. In some embodiments, beacons may be based on, for example, orthogonal codes, pseudo-noise sequences, or BCH codes.

The allocation (and/or re-allocation) of 110 and 125 (later described) may be performed in a resource efficient way.

In some embodiments, it may be beneficial to minimize the total number of beacon transmissions. For example, beacon transmission may be allowed only by one device at a time and the other devices are asked to listen. Thus, beacon transmission allocation may first allow a first device to transmit, then a second device, then a third device, and so on.

This approach may be taken towards all D2D capable devices registered at the network node, or towards a group of D2D capable devices registered at the network node (e.g. a group of devices being close to each other, in a same geographical region, or otherwise likely to be able to set up D2D communication). In the latter case, beacon transmission allocation may, thus, first allow a first device of a first group and a first device of a second group to transmit simultaneously, then a second device of the respective groups, and so on. In such an example, the devices of the first group are asked to listen only for the beacons transmitted in relation to the first group and similarly for the devices of the second group.

This approach provides the advantage of having a structured beacon transmission scheme, which minimizes the number of beacons transmitted in the cell/region. The risk of interference between beacons is also minimized as well as the interference generation by beacons towards other signaling of the cell. This is achieved while not compromising the amount of information that it is possible to extract via the beacon process.

In some embodiments, it may be beneficial to minimize the total number of beacon transmissions and/or the total amount of beacon monitoring. For such a purpose it is noted that the conditions of a signal path from a first device to a second device is probably equal or at least similar to the conditions of the signal path in the opposite direction (at least if a similar frequency band is used for communication in both directions, e.g. TDD, but also possibly feasible for FDD since the average link attenuation is typically highly correlated also for FDD). Thus, to detect D2D communication prospects and/or to estimate signaling conditions of a prospect D2D link, it may be sufficient to let only one of the two devices transmit a beacon and let the other listen.

Following this principle, the allocation of beacon resources (to all D2D capable devices registered at the network node, or towards a group of devices) may be adjusted by not activating a device for listening purposes once it has transmitted its allocated beacon. Thus, beacon transmission allocation may first allow a first device to transmit and ask the other devices to listen, then a second device is allowed to transmit and the other devices (except the first device) are asked to listen, then a third device is allowed to transmit and the other devices (except the first and second device) are asked to listen, and so on.

This approach has the further advantage of minimizing the average beacon listening time of a device and, hence, power consumption.

In some embodiments, a beacon transmission resource may be allocated only to one or more devices that have changed its location (compare with device 70 of FIGS. 1a and 1b). Such a location change may, for example comprise entering of a cell, but it may also or alternatively comprise movement of the device within a cell (e.g. detected by positioning equipment of the device such as a GPS). Thus, when a device has moved it may be allocated a beacon transmission resource by the network node, who may also ask the other devices to listen accordingly. The network may ask all D2D capable devices in a cell to listen. Alternatively, it may ask only the devices of a group as described above to listen. The group may be a group that the device belonged to according to a previous location and/or a group that the device belongs to according to a current location. For example, only the group the device previously belonged to may be asked to listen if a small movement is detected, while a new group (or all devices) may be asked to listen if a large movement or cell change is detected. In some embodiments devices that have not moved are not allocated any beacon transmission resources.

A location change of a device may be detected autonomously by the network node (e.g. for a cell change) or may be detected by the network node via signaling from the device to the network node (e.g. a GPS of the device detecting movement within a cell). Another way of detecting a possible location change may comprise evaluating whether the corresponding radio links have changed.

In 215, a new device (device 201) commences registration to the network node 101, e.g. by transmission of a registration request message 216, and the network node 101 registers the new device 201 in 115, e.g. by transmission of a registration response message 217. The registering of the new device are presented as optional in this example, since the subsequent actions may take place even if the new device is already registered to the network node.

In 220, the device 201 transmits a D2D capability indication (e.g. a D2D access request) to the network node 101 who receives the indication in 120. The D2D capability indication may be transmitted via the message 221 as illustrated in FIG. 2. Alternatively 220 and 120 may be part of the registration procedure 215, 115, in which case the D2D capability indication may be comprised in the registration request message 216. The D2D capability indication may comprise one or more global device identities associated with the device 201.

In 125, the network node 101 allocates beacon resources to the device 201 in a similar way as was described in relation to 110. If applicable, the network node 101 may also re-allocate already allocated resources of other devices based on the new conditions in 125.

A beacon configuration request message 231 may optionally be transmitted in 230 by the device 201 and received in 130 by the network node 101.

Either as a response to a beacon configuration request message 231 or autonomously, the network node 101 may transmit information regarding the allocated beacon resources for the device 201 in 135 using message 237. Similarly, either as a response to the beacon configuration request message 231 or autonomously, the network node 101 transmits information regarding the allocated beacon resources for other devices in 140 using message 242.

In some embodiments, the network node may receive information regarding the allocated beacon resources for neighboring network nodes.

In such embodiments, the transmission of beacon information in 135 and 140 may further comprise transmitting information regarding the allocated beacon resources for devices in the cell of network node 101 to neighboring network nodes using either one or more of the messages 237 and 242 or a separate message (not shown).

The transmission of beacon information in 140 may even further comprise transmitting information regarding the allocated beacon resources for devices in other, neighboring, cells using message 242.

The transmissions in 135 and 140 may be joint transmissions to the device 201 and other devices (e.g. broadcasting the information or using a shared channel). Alternatively or additionally, the transmissions in 135 and 140 may comprise separate transmissions to the device 201 and other devices respectively (e.g. using dedicated signaling). For example, the transmission may be in the form of a dedicated data packet message (e.g. on the Application layer), a dedicated Radio Resource Control (RRC) message, or a dedicated MAC layer message.

The information regarding the allocated beacon resources of the transmissions 237, 242 may e.g. comprise a local device identity, a beacon signature, a beacon signal shape, a beacon signature, a beacon signal pattern (e.g. a pattern in time and/or frequency where the beacon signal shape/signature should be used and/or a definition of how the beacon signal shape/signature should be repeated), and/or a beacon transmission power (minimum/actual/maximum). The beacon transmission power could comprise one or more of a maximum allowed transmission power, a minimum allowed transmission power, an allowed transmission power range, and a transmission power variation scheme (e.g. with different transmission power for different time/frequency resources).

The beacon signature sequence could be of any suitable type, e.g. an orthogonal code, a pseudo noise sequence, a BCH code, etc. The beacon signature sequence could be used as the LDID. Alternatively, the LDID may be mapped to a signature sequence according to a predefined rule (e.g. based on standardized protocols, information previously received from the network, a look-up table, etc). Yet alternatively, the LDID may be used to generate a signature sequence (e.g. by defining a coding or filter parameters to be used for generating the signature).

In some embodiments, the actions in 125 may be part of the registration procedure 215, 115 and part (e.g. LDID) or all of the information of 237 and 242 may be included in a registration response message 217.

The transmission of allocation information regarding other devices in 140 may be based on which devices have a good prospect of D2D communication with the new device 201 (e.g. have similar D2D capabilities, are in a geographical vicinity, have good radio conditions of a prospect D2D link, etc). Such information may be stored for each device together with the beacon allocation information in the network node (or any other suitable entity of the network).

In 235, the device 201 receives the information regarding its own allocated beacon resources, and uses the information to transmit its beacon in 245. The beacon transmission may be done using any suitable known or future method. For example, a beacon signature may be mapped to a modulation (according to an applicable standard) and transmitted. The transmission pattern may be the time/frequency resources to be used for transmission of the signature. Such resources could be a single instance or according to a repetition pattern. The pattern could be regular or irregular in time domain, and could also be shifted in frequency in a regular or irregular manner. The frequency shift could be in between two transmission instances of the pattern, but could also be a frequency shift of resources in a specific beacon transmission session (e.g. similarly to transmission in PUCCH, where a first frequency allocation (e.g. end of available bandwidth) is applied in a Slot-1 of a PUCCH transmission of 3GPP Rel 10, while a second, different, frequency allocation (e.g. start of available bandwidth) is applied in a Slot-2 of the PUCCH). Using an example applicable to UMTS LTE, a time shift could be in between slots in a sub frame, i.e., similar to the PUCCH transmission. Such a shift between slots in a sub frame may be comprised in the information of the configuration message 237, but may also be pre-defined in the standard. The transmission pattern may further include a start time and a stop time for the pattern. The beacon transmission may, for example, be stopped if a stop condition is fulfilled, if an end of transmission pattern is reached, or if a timer is timed out.

In 240, the device 201 receives information regarding allocated beacon resources of other devices. This information is used in 250 to monitor only relevant beacon resources. In some embodiments, the device only enables its receiver at time intervals where beacon signals are expected according to the received beacon configuration message.

It is noted that one or more of the actions described as optional in this example may be non-optional in other examples. Likewise, one or more of the actions described as non-optional in this example may be optional in other examples.

In this example, 135, 235, 245 are described as optional. They only apply to devices acting as masters.

As mentioned earlier, master devices transmit beacon signals and slave devices scan for beacons. It should be noted that a device may take the role of master only, slave only or a combination of both roles.

Depending on the situation (e.g. if a beacon is sent, radio conditions, etc.), a beacon may or may not be detected in 255. The detection process may comprise any suitable known of future algorithms. For example, the detection could comprise one or more of signal detection, energy detection, correlation to one or more known sequences, and decoding of a coded message. The discovery procedure 250, 255 may be terminated once one beacon signal or a subset of beacon signals have been discovered (each discovered beacon signal typically associated with a separate LDID and/or a separate device). It could also be terminated when a particular (predetermined or dynamic) time has elapsed, e.g. when a timer associated with the transmission pattern information or discovery session has timed out.

A beacon measurement report (or beacon detection report) 261 is transmitted by the device 201 in 260. It is received by the network node 101 in 160. This relates to the situation when the device is a beacon monitoring device (slave). The report may be transmitted at predetermined times/intervals (regardless of whether a beacon has been detected or not) and/or as a consequence of beacon detection in 255.

In some embodiments, a beacon measurement report 262 is transmitted by the network in 160 and received by the device in 260. This relates to the situation when the device is a beacon transmitting device (master).

Thus, the network node 101, may receive one or more beacon measurement reports in 160 and transmit (at least part of) the information therein to one or more device as illustrated by 262. For example, information may be transmitted to each device regarding which other devices are prospects for D2D connection based on the information in the beacon measurement reports. The beacon measurement reports to and from the network node, 261 and 262 respectively, may have the same or different format.

The beacon measurement report 261 may comprise information relating to how many beacons (if any) has been detected and particulars of the detected beacons (e.g. one or more of beacon signature, corresponding LDID, a cell identity (i.e. an indication of which cell the beacon transmitting device belongs to), received power of the beacon, RSSI, RSRP, RSRQ, an interference estimate, signal-to-noise ratio (SNR), signal-to-interference ratio (SIR), signal-to-noise and interference ratio (SINR), estimated path loss and/or radio channel between the corresponding devices, etc.). Other particulars of detected signals may also be reported. For instance, the timing (may be within a cyclic prefix for an OFDM system) of the detected signal in relation to another timing (e.g. DL or UL timing for the connection to the network node) may be reported. The number of detection trials prior to actual detection may also be reported. Another example of report content may be an indication regarding at which time/frequency resource the beacon signal was detected.

The beacon measurement report 262 may comprise the same or similar information as the report 261. Additionally or alternatively, the beacon measurement report 262 to a particular device may comprise information (e.g. identities, radio condition estimation, etc.) regarding which devices have indicated that they have reliably detected the beacon of the particular device. Yet additionally or alternatively, the beacon measurement report 262 to a particular device may comprise information regarding which devices (of any) may cause interference to the particular device.

The beacon measurement report may be used by the network node to assist 165, 170, 175 in the setup of a connection between the device 201 and another particular device. For example, the network node may relay (at least part of) the information to the relevant devices to assist the device in setting up a D2D connection and/or to decide whether or not to set up a D2D connection at all.

In another example, the report may be used to determine in 165 whether to use cellular connection or D2D connection (or whether to set up a connection at all). A D2D connection may be chosen if the device 201 has detected the beacon of the particular device and a cellular connection may be chosen if the beacon of the particular device was not detected. Other conditions may also apply, for example, the radio propagation conditions on a prospective D2D link, radio propagation conditions on a link between the network node and the device 201 (and/or on a link between the network node and one or more other devices, e.g. another device of a prospect D2D communication), the current traffic load and/or capacity of the network node, etc. A D2D connection may, for example, be chosen if the current traffic load of the cell is high and/or if the respective links between the network and the devices of a prospect D2D communication have bad radio conditions while a prospect D2D link between the devices have good radio conditions. In the embodiments where beacons of neighboring cells are also included in the scanning process and in the reporting to network, such information may be used to determine whether or not to handover a device (or more generally, perform a cell change for the device) to a neighboring cell (or request a handover from a neighboring cell) before initiating a D2D connection setup.

If a cellular connection is chosen, the network node sets it up in 175. If a D2D connection is chosen, the network node may assist in the setup in 170 and 270. For example, the network node may determine which type of D2D connection to use (unlicensed or licensed, protocol applicable, etc.), allocate resources for the D2D connection (e.g. spectrum, time, frequency), provide power control (e.g. set initial transmission power based on a received beacon signal power). This assistance may utilize signaling 271, 272 between the network node and the device 201 (and between the network node and the other particular device). For example, such signaling may render unnecessary sending an acknowledgement message directly from the device 201 to the particular device when its beacon has been detected.

When the D2D connection has been set up the two devices communicate directly with each other according to the D2D communication protocol in 275.

In the example of FIG. 2, the search/monitoring/detection 250, 255 and the reporting 260 have been described as separate actions. It is noted that they may be performed in parallel or iteratively according to some embodiments. For example, a detected beacon may be reported as soon as it is detected, while a search for other beacons is still ongoing. In some embodiments, a timer associated with the end of the beacon reception pattern controls when the report should be transmitted. The reporting may be event triggered (e.g. when a detection is made or according to a timer) or periodic. A periodic report may include information of all beacons detected since the previous report. A report could include an empty set (e.g. if no beacons have been detected when the report is due), or could be omitted when there is nothing to report.

Furthermore, the (optional) beacon transmission 245 and the beacon scanning and reporting 250, 255, 260 have been described as separate actions. It is noted that they may be performed another order, in parallel (interleaved), or iteratively according to some embodiments. For instance, the device may switch back and forth between beacon transmission and beacon scanning/reception, or may have the capability to transmit its own beacon and scan for other beacons simultaneously.

As mentioned above, a network node may (according to some embodiments) obtain from one or more neighboring network nodes, information related to the beacon resources allocated by the neighboring network nodes to the D2D capable devices under their control for D2D operation or communication. The information may also indicate the beacon resources reserved by these neighboring network nodes for D2D capable devices. More specifically the information retrieved from the neighboring network nodes may comprise the local device identities assigned to the D2D capable devices and/or reserved for the D2D communication by these neighboring network nodes.

The information may also contain additional information such as the duration (e.g. T0) when the local device identities are assigned to the D2D capable devices. The information related to duration may be associated with each beacon resource or with a group of beacon resources or may be common for all beacon resources. The duration may be expressed in terms of the starting reference time (e.g. in terms of system frame number (SFN) in a neighboring cell) when the beacon resources are assigned to the D2D capable devices, duration from the starting reference time and/or end of the duration (e.g. in terms of SFN of a neighbor cell).

The network node may transmit all or part of the received information (related to the beacon resources and/or corresponding LDIDs from the neighboring network nodes) to the D2D capable devices operating under its control. The network node may also inform its D2D capable devices that the transmitted information corresponds to beacon resources used and/or reserved for D2D capable devices by one or more neighboring network nodes.

The D2D capable devices may be requested by the network node to identify or detect (or perform measurement(s) on an identified beacon signal of) any possible D2D capable device using any of the neighboring beacon resources and inform the network node about the identified D2D capable devices. The D2D capable devices may be requested to perform signal measurements (e.g. signal strength, path loss, signal quality, etc) on the detected neighboring beacon resources and perform a radio operation task. Examples of radio operation task are selecting or re-selecting a second wireless device for D2D communication, and/or reporting the measurement results to the network node. The selecting or re-selecting of a second wireless device for D2D communication may be based on a pre-defined rule and/or a combination of pre-defined rule and network signaled parameters (e.g. signal threshold).

The report received by the network node may be used for one or more network operational tasks. Some examples of network operational tasks include, but are not limited to, performing a cell change of a D2D capable device to one of the neighboring nodes, requesting a cell change of a D2D capable device from one of the neighboring nodes, planning and assignment of beacon resources to D2D capable devices, and forwarding of partial or full report to neighboring nodes.

For example, a cell change may be performed if a D2D capable intends to establish a D2D link with a D2D capable device operating under a neighboring network node. Examples of cell changes (or cell switches) include handover, RRC connection release with redirection, RRC connection re-establishment, cell reselection, PCell change in carrier aggregation or multi-carrier operation, etc.

Examples of when forwarding of partial or full report to neighboring nodes may be beneficial include the scenario when the neighboring node is one of a self organizing node (SON), a network monitoring node, an OSS (operation support system) node, an O&M (operation and maintenance) node, a minimization of drive test (MDT) node, etc. These nodes may further use the results for improving network operation by tuning parameters such as assignment and distribution of beacon resources in the network.

However, all D2D capable devices may not be capable of identifying, measuring, and reporting beacon resources of neighboring network nodes. For example, the device may lack the required processing and memory resources.

Thus, in some embodiments, the D2D capable device may report its capability regarding neighboring beacon resources to the network node. The reported capability information may also comprise additional information. Examples of additional information include, but are not limited to, a maximum number (total or per neighboring network node) of neighboring beacon resources on which the device can do measurements.

For example, the device may send the capability information to the network node by proactive reporting without receiving any explicit request from the network node, or by reporting upon receiving an explicit request from the network node. The explicit request may be sent to by the network node at any suitable time or occasion. For example, the request may be sent to the device during initial setup or after a cell change. For proactive reporting, the device may, for example, report its capability during an initial setup and/or a call setup (e.g. when establishing the RRC connection) and/or a cell change.

The network node may use the received capability information for various network operational tasks.

According to one example, the capability information may be forwarded to a device in D2D communication mode and/or to another network node, e.g., a radio network node, a core network node, or a positioning node. The forwarded information may be useful, for example, after a cell change (so that the device may not be required to signal its capability again after a cell change).

The network may also use the capability information to decide whether to request a particular D2D capable device to identify and report the measurements on neighboring network node beacon resources or not. The network node may also use the received capability information to select one or more configuration parameters used in the measurement configuration information element sent to the D2D capable device for measuring on the neighboring network node beacon resources. For example, the network node may (based on the received capability information) select a maximum number of neighboring network node beacon resources to be sent to the D2D capable device for performing such measurements.

Figures 3, 4:
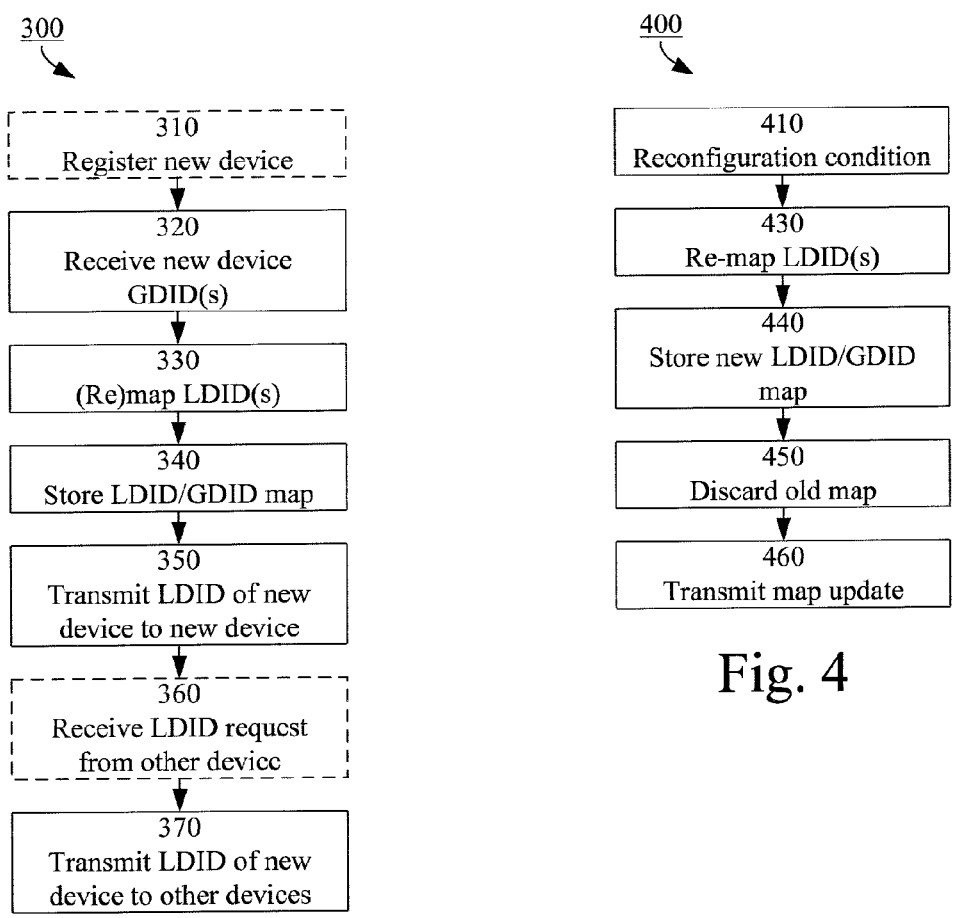
FIG. 3 is a flowchart illustrating an example method according to some embodiments.
FIG. 4 is a flowchart illustrating an example method according to some embodiments.

FIG. 3 is a flowchart illustrating an example method 300 of a network node (e.g. the network node 40 of FIG. 1a and/or 101 of FIG. 2) according to some embodiments. The method 300 may be combined with the method 100.

In 310 a new device is registered to the network node, and one or more global device identities (GDID) are received from the new device in 320. The reception of the GDID of 320 may be comprised in the registration procedure 310 according to some embodiments. Each GDID may be associated with the device per se or with one (possibly out of several) subscription used by the device. Even further, a device (or subscription) may be associated with different GDIDs for different services (offered or requested by the device), for example. One example is to use IMSI as a GDID. An example of several GDIDs for a single device could be a vending machine selling several beverages, each having its own GDID. A GDID could be a combination of, for example, a subscription specific and service specific ID. The GDIDs are typically associated with the devices independently of the location or current tracking area or cell association of that device.

The network node (or any other suitable part of the network) maps the received GDID(s) to one or more local device identities (LDID) in 330. If required a re-map of already allocated LDIDs may also take place here as will be described further in connection to FIG. 4. The LDID is typically substantially shorter than the GDID, and the set of possible LDIDs is substantially smaller than the set of GDIDs. For instance, the number of LDIDs could be in the range of 10,000 to 1 million while the number of GDIDs could be in the range of 10 billion to 1,000 billion. This is made possible by the particular LDIDs being applicable only within a limited geographical area, e.g. the coverage area of a base station or access point.

The mapping of each GDID to a LDID can be one-to-one, one-to-many or many-to-one. Typically the mapping is confined so that in a one-to-many or many-to-one map all identities are associated with the same device. In some embodiments, the device is allocated one LDID, i.e. all GDIDs associated with the device are mapped to one LDID. In some embodiments, a subset of the GDIDs of a device is associated with one LDID and another subset of the GDIDs of a device is associated with another LDID. Hence, the device is allocated several LDIDs in such embodiments. An example where this approach may be useful is when the device supports different services that could be subject of D2D communication, and each service gets its own LDID.

IN some embodiments, a device may only have one GDID and several LDIDs are allocated, e.g. depending on requested service.

The mapping is stored in the network node (or any other suitable part of the network) as shown by 340.

In some embodiments, one or more entries in the map may be tagged with information regarding link qualities associated with the device. The link quality information may be based on signal strength measurements for the connection between the relevant device (associated with the map entry) and the network node, or on link quality estimates for a connection between the relevant device and other devices (e.g. based on earlier detected beacons).

Information indicative of at least the LDIDs of the new device is transmitted to the new device (in 350) and to one or more other devices (in 370). These transmissions may comprise transmission of the full map, a partial map (e.g. the updated parts), or only the LDID of the new device. Similarly to the beacon information described in relation to FIG. 2, the information indicative of the LDID may be transmitted as to several devices simultaneously (e.g. broadcast or shared signaling) or to each device separately (e.g. dedicated signaling). The LDID information transmission may be at a predetermined time, at regular time intervals (e.g. periodically), or as a response to the LDID request received from a device as illustrated in 360. The general principles, alternatives and examples described in connection with step 140 of FIG. 2 may apply also to 370.

The transmission of full or partial map to other devices in 370 may be to all (or subset of) D2D capable devices registered at the network node. It could for example be a subset based on which devices have a good prospect of D2D communication with each other (e.g. have similar D2D capabilities, are in a geographical vicinity, have good radio conditions of a prospect D2D link, etc), and/or which devices relate to a similar service. Different parts of the map may be transmitted to different devices.

FIG. 4 is a flowchart illustrating an example method 400 of a network node (e.g. the network node 40 of FIG. 1a and/or 101 of FIG. 2) according to some embodiments. The method 400 may be combined with the method 300 and/or the method 100.

In 410 it is determined that a reconfiguration of a mapping between GDIDs and LDIDs is necessary or desirable. This may be due to that a new device enters the cell (or registers its D2D capability), that a device leaves the cell (or deregisters its D2D capability), that traffic conditions in the cell have changed, etc. For example, a reconfiguration may be desirable to keep the signal distance between allocated beacons as large as possible.

The network node (or any other suitable part of the network) re-maps the active GDID(s) to LDID(s) in 430.

The new mapping is stored in the network node (or any other suitable part of the network) as shown by 440, and the old mapping is discarded as shown in 450. Obviously, 440 and 450 may comprise only updating the parts of the stored mapping that have changed.

Information indicative of at least the updated LDIDs are transmitted (in a similar way as described in connection to FIG. 3) to the relevant devices as shown by 460.

Typically, the LDID (as described in connection to either of FIGS. 2, 3 and 4) associated with a device may be used by the same device to generate information for beacon transmission and by other devices to generate information for beacon scanning. The generation may for example, be via a look-up table and/or via running one or more shift registers with the LDID as initial value.

By using the very short representation of the LDID, beacon information may be very efficiently communicated to both master and slave devices and efficient peer discovery is facilitated.

By providing for allocation and re-allocation a dynamic allocation approach is achieved, where the network may allocate beacon resources (e.g. LDID) based on current conditions (e.g. current number of D2D devices in the cell, the current cell load, etc.). This provides for more efficient beacon signaling and also for more efficient and dynamic partition of cellular versus D2D communication in the cell.

Embodiments provide better utilization of the spectrum for network assisted D2D communication. For example, the beacon reports enable the network node to make informed decisions regarding which communication approach to use. Embodiments also provide for a reduction of the search space for a device in the peer-discovery procedure (e.g. by using mapping of GDID to LDID and/or by informing a device of beacon particulars of other relevant devices). This in turn reduces the power consumption for a device.

In some embodiments (e.g. for multi-operator deployment), the concept of LDIDs specific for a cell may be further developed. In such scenarios, the LDID may be complemented by an Operator Identity (OPID), where the OPID for instance might be one byte. The GDIDs may in such scenarios be mapped to OPIDs and LDIDs. An OPID is typically unique for an operator (at least within a specific geographical region). Typically, different operators in the same region may coordinate their respective mapping such that a device which is in the coverage area of two or more operators will obtain the same LDID from all operators, but different OPID.

It should be noted that the examples herein mainly refer to the situation when a single network node is involved in the network assisted device-to-device communication. It is noted that this network node may be any suitable network node, e.g. a base station or (e) NodeB, a network controller node, a relay node, etc. A network node may be in control of beacon (and/or other D2D) resources relating to one or several base stations. For example, a network controller may allocate beacon resources to devices operating under different base stations.

In some embodiments, a first network node is in control of a first set of beacon resources and a second network node is in control of a second set of beacon resources. The first and second sets may coincide, may be overlapping or may be non-overlapping. The first network node may acquire information regarding allocated beacon resources in the second network node. Such information may be shared with devices under control by the first network node. If it is detected that a first device under control by the first network node and a second device under control by the second network node may set up a D2D connection, there can either be a change of node (e.g. cell change) for one of the devices or the D2D connection can be assisted by one of the network nodes using the other network node as a relay when required.

Figure 5:
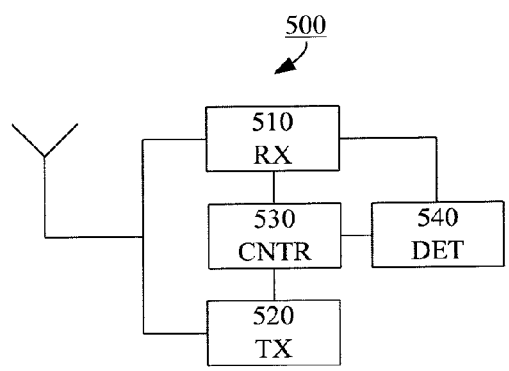
FIG. 5 is a block diagram illustrating an example arrangement according to some embodiments.

FIG. 5 is a block diagram illustrating an example arrangement 500 according to some embodiments. The example arrangement may be comprised in a device (e.g. one of the devices 10 and 20 of FIG. 1a and/or the device 201 of FIG. 2).

The arrangement comprises a receiver 510, a transmitter 520, a controller 530 and a detector 540, and may be adapted to perform e.g. the method 200 of FIG. 2. The transmitter is adapted to transmit a D2D capability indication, possibly as part of a registration request message. The receiver may be adapted to receive a registration acknowledgement message in response to a registration request message.

The transmitter may also be adapted to transmit a beacon request message, and the receiver is adapted to receive beacon information relating to the device itself and/or to other devices.

The controller is adapted to monitor beacon signaling of other devices in accordance with the received information. For example, the controller may be adapted to cause the receiver to listen in accordance with the received information. The detector is adapted to detect a beacon signal if present in the monitored signaling. The controller may also be adapted to cause the transmitter to transmit a beacon signal according to the received information.

The transmitter is adapted to transmit beacon measurement reports in accordance with the result of the monitoring of beacon signaling. The transmitter, receiver and controller are adapted to set up a D2D connection and to communicate according to a D2D protocol.

It is noted that the transmitter and receiver may be comprised in a single entity (a transceiver), and that the controller and the detector may be comprised in a single entity. It is also noted that the transmitter and/or receiver may comprise several different transmitters/receivers, e.g. a D2D transmitter/receiver pair and a cellular transmitter/receiver pair.

Figure 6:
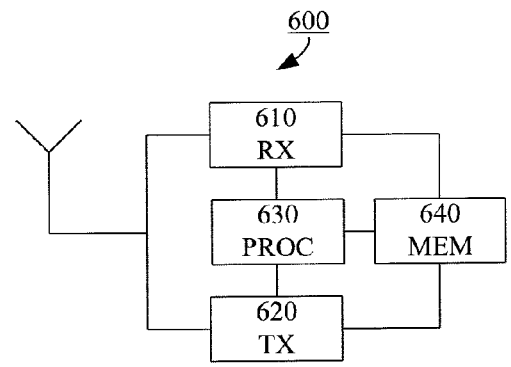
FIG. 6 is a block diagram illustrating an example arrangement according to some embodiments.

FIG. 6 is a block diagram illustrating an example arrangement 600 according to some embodiments. The example arrangement may be comprised in a network node (e.g. 40 of FIG. 1a and/or 101 of FIG. 2).

The arrangement comprises a receiver 610, a transmitter 620, a processor 630 and a memory 640 (which may or may not be comprised in the same device as the other parts of the arrangement), and may be adapted to perform e.g. the method 100 of FIG. 2 and/or any or both of the methods 300 and 400 of FIGS. 3 and 4 respectively.

The receiver is adapted to transmit a D2D capability indication, possibly as part of a registration request message and possibly comprising one or more GDIDs. The transmitter may be adapted to transmit a registration acknowledgement message in response to a registration request message.

The processor is adapted to allocate and re-allocate beacon resources. This may include mapping GDIDs to LDIDs and storing the mapping in the memory 640 adapted for this purpose.

The receiver may also be adapted to receive a beacon request message, and the transmitter is adapted to transmit information relating to the allocation of beacon resources.

The receiver may be adapted to receive beacon measurement reports, and the processor may be adapted to use the reports to assist in setup of a connection between two devices as has been described in connection to FIG. 2.

It is noted that the transmitter and receiver may be comprised in a single entity (a transceiver).

The described embodiments of the invention and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus (e.g. a wireless communication device) comprising circuitry/logic or performing methods according to any of the embodiments of the invention. The electronic apparatus may, for example, be a portable or handheld mobile radio communication equipment, a mobile radio terminal, a mobile telephone, a base station, a communicator, an electronic organizer, a smartphone, a computer, a notebook or a mobile gaming device.

Figure 7:
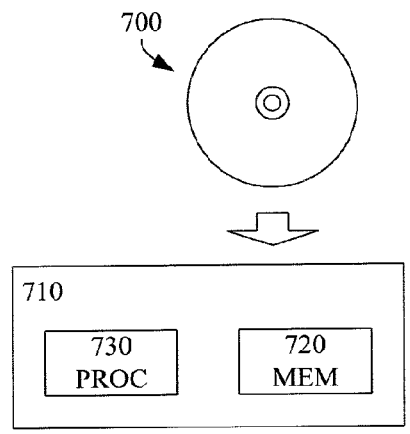
FIG. 7 is a schematic drawing illustrating a computer readable medium according to some embodiments.

According to some embodiments of the invention, a computer program product comprises a computer readable medium such as, for example, a diskette or a CD-ROM as illustrated by 700 of FIG. 7. The computer readable medium 700 may have stored thereon a computer program comprising program instructions. The computer program may be loadable into a data-processing unit 730, which may, for example, be comprised in a mobile terminal or network node 710. When loaded into the data-processing unit 730, the computer program may be stored in a memory 720 associated with or integral to the data-processing unit 730. According to some embodiments, the computer program may, when loaded into and run by the data-processing unit, cause the data-processing unit to execute method steps according to, for example, the methods shown in any of the FIGS. 2, 3 and/or 4.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A method by a cellular radio network node configured to provide cellular radio services in a cellular radio network and to provide assistance for device-to-device communications between wireless devices served by the cellular radio network, comprising:

receiving, via the cellular radio network, from a first wireless communication device configured to perform device-to-device communication, one or more first global device identities associated with the first wireless communication device;

allocating one or more first local device identities to the first wireless communication device, from a set of local device identities associated with a coverage area of the cellular radio network corresponding to a current location of the first wireless communication device, said allocating based on the number of wireless communication devices within the coverage area that are active with respect to device-to-device communications, or at least capable of device-to-device communications;

storing, in association with the cellular radio network node, a mapping between each of the received one or more first global device identities and each of the allocated one or more first local device identities;

transmitting information indicative of the allocated one or more first local device identities to the first wireless communication device, via the cellular radio network; and transmitting information indicative of at least one of the allocated one or more first local device identities, via the cellular radio network, to a first group of one or more other wireless communication devices configured to perform device-to-device communication, wherein the first group of one or more other wireless communication devices is a subset of all device-to-device communication capable devices registered to the cellular radio network node;

wherein given wireless communication devices that are allocated given local device identities from the set of local device identities use the allocated local device identities to generate beacon signals for device-to-device communications, and wherein the set of local device identities is designed to minimize a mutual cross correlation or maximize a signal distance between such beacon signals.

2. The method of claim 1, wherein allocating the one or more first local device identities comprises, for each particular received one or more first global device identity:

allocating a unique first local device identity to the particular first global device identity;

allocating a plurality of first local device identities to the particular first global device identity; or allocating a first local device identity to the particular first global device identity, wherein the first local device identity is allocated to a plurality of first global device identities.

3. The method of claim 1, wherein the one or more first global device identities associated with the first wireless communication device are received in a registration procedure of the first wireless communication device to the cellular radio network node.

4. The method of claim 1, wherein transmitting the information indicative of the at least one of the allocated one or more first local device identities to the first group of one or more other wireless communication devices is performed on request of one of the first group of one or more other wireless communication devices.

5. The method of claim 1, wherein the subset comprises wireless communication devices fulfilling one or more device-to-device communication criteria in relation to the first wireless communication device.

6. The method of claim 1, further comprising allocating one or more first operator identities to the first wireless communication device.

7. The method of claim 1, further comprising:
reallocating one or more other first local device identities to the first wireless communication device;
discarding the mapping between each of the received one or more first global device identities and each of the allocated one or more first local device identities;
storing, in association with the cellular radio network node, a mapping between each of the received one or more first global device identities and each of the reallocated one or more other first local device identities;
transmitting information indicative of the reallocated one or more other first local device identities to the first wireless communication device, via the cellular radio network; and
transmitting information indicative of at least one of the reallocated one or more other first local device identities, via the cellular radio network, to the first group of one or more other wireless communication devices.

8. The method of claim 1, further comprising:
receiving, via the cellular radio network, from a second wireless communication device configured to perform device-to-device communication, one or more second global device identities associated with the second wireless communication device;
allocating one or more second local device identities to the second wireless communication device, from said set of local device identities;
storing, in association with the cellular radio network node, a mapping between each of the received one or more second global device identities and each of the allocated one or more second local device identities;
transmitting information indicative of the allocated one or more second local device identities to the second wireless communication device, via the cellular radio network; and
transmitting information indicative of at least one of the allocated one or more second local device identities, via the cellular radio network, to a second group of one or more other wireless communication devices configured to perform device-to-device communication.

9. A method at a cellular radio network node comprising:
maintaining a set of local device identities for use by wireless communication devices in generating beacon signals used for device-to-device communications within a cellular network coverage area handled by the cellular radio network node, said set of local device identities configured to reduce mutual interference between beacon signals generated from different ones of the local device identities;
allocating particular ones of the local device identities from the set of local device identities to respective wireless communication devices that are active in or at least capable of device-to-device communication and are operating in the cellular radio network within the cellular network coverage area, in dependence on the number of the respective wireless communication devices; and
adapting the particular ones of the local device identities that are allocated, responsive to given one of the respective wireless communication devices leaving the cellular network coverage area, and responsive to new wireless communication devices entering the cellular network coverage area, said new wireless communication devices being active in or at least capable of device-to-device communication.

* * * * *

UNITED STATES PATENT AND TRADEMARK OFFICE
CERTIFICATE OF CORRECTION

| | |
|---|---|
| PATENT NO. | : 9,654,443 B2 |
| APPLICATION NO. | : 14/400577 |
| DATED | : May 16, 2017 |
| INVENTOR(S) | : Lindoff et al. |

Page 1 of 1

It is certified that error appears in the above-identified patent and that said Letters Patent is hereby corrected as shown below:

On the Title Page

In Item (54), in Title, in Column 1, Line 3, delete "D2D" and insert -- (D2D) --, therefor.

On Page 2, in Item (56), under "U.S. PATENT DOCUMENTS", in Column 2, Line 3, delete "Yu" and insert -- Yu et al. --, therefor.

In the Specification

In Column 1, Line 3, in Title, delete "D2D" and insert -- (D2D) --, therefor.

In Column 6, Line 29, delete "a adapted" and insert -- adapted --, therefor.

In Column 15, Line 20, delete "transmissions" and insert -- messages --, therefor.

In Column 17, Line 9, delete "(SINR)," and insert -- (SNIR), --, therefor.

In the Claims

In Column 26, Line 38, in Claim 9, delete "node" and insert -- node, --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*